United States Patent [19]
Paschke

[11] 4,319,140
[45] Mar. 9, 1982

[54] DEMAND OPERATED POWER MANAGEMENT DRIVE SYSTEM

[76] Inventor: Ralph W. Paschke, 3324 W. Sierra Vista, Phoenix, Ariz. 85017

[21] Appl. No.: 172,680

[22] Filed: Jul. 28, 1980

[51] Int. Cl.³ .............................................. B60K 1/00
[52] U.S. Cl. ..................................... 290/45; 290/4 C
[58] Field of Search ................... 290/4,45, 50; 60/716; 190/65 A

[56] References Cited

U.S. PATENT DOCUMENTS

| | | | |
|---|---|---|---|
| 3,221,172 | 11/1965 | Rolison | 290/4 R |
| 3,732,751 | 5/1973 | Berman et al. | 290/4 C X |
| 3,888,325 | 6/1975 | Reinbeck | 290/45 X |
| 4,148,192 | 4/1979 | Cummings | 290/50 X |

*Primary Examiner*—Gene Z. Rubinson
*Assistant Examiner*—W. E. Duncanson, Jr.
*Attorney, Agent, or Firm*—Herbert E. Haynes, Jr.

[57] ABSTRACT

A drive system having a power input subsystem which operates and regulates the input power to the drive system in response to the demand placed thereon, and apportions the input power in accordance with the individual loads placed on the drive system by separate driven entities.

20 Claims, 6 Drawing Figures

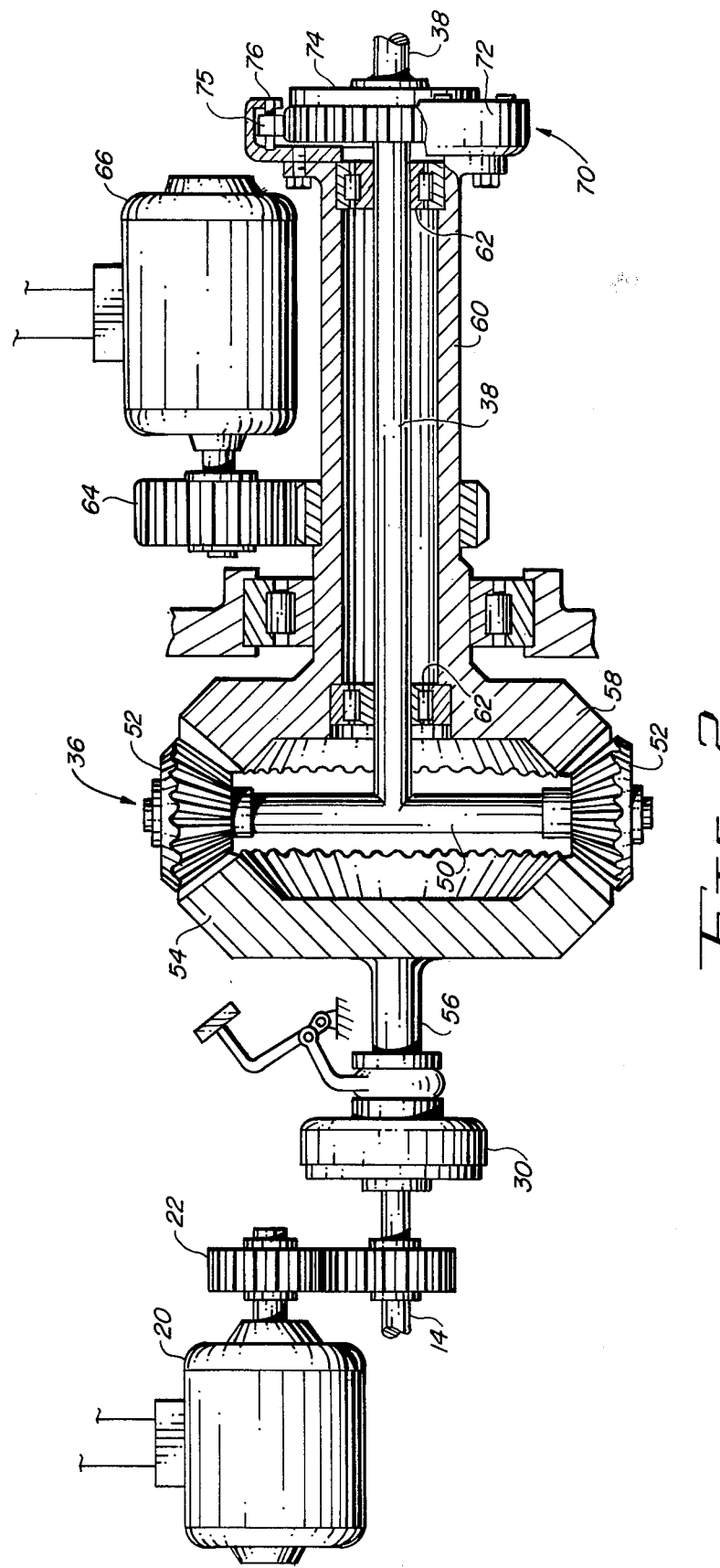

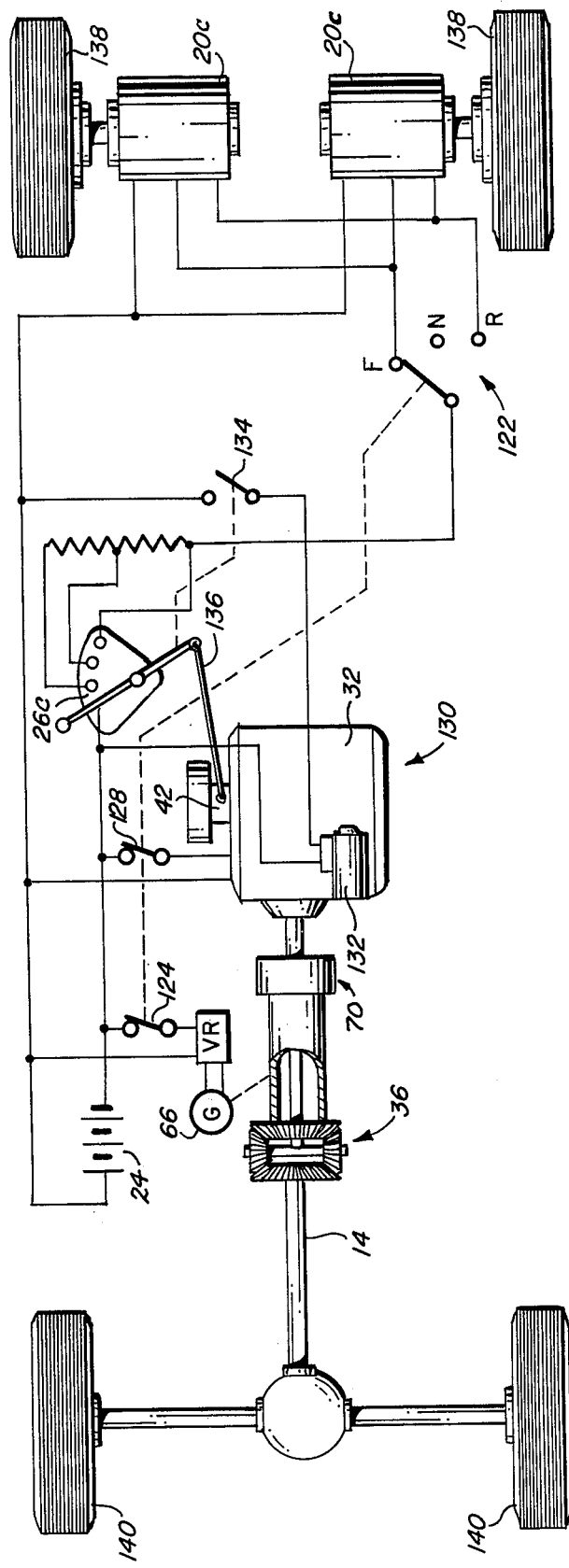
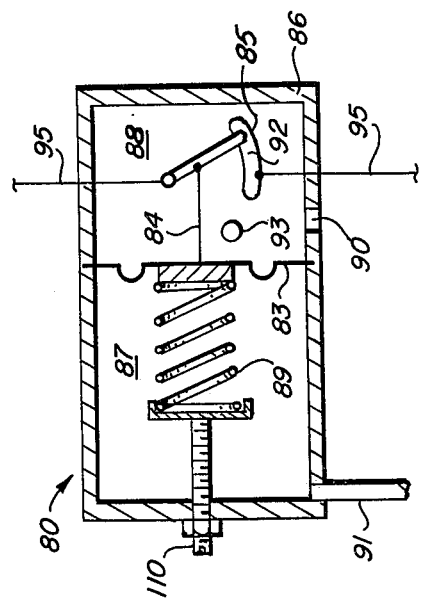

DEMAND OPERATED POWER MANAGEMENT DRIVE SYSTEM

BACKGROUND OF THE INVENTION

1. Field of the Invention

This invention relates in general to drive systems and more particularly to a drive system having an optionally operable power input subsystem which regulates the amount of power input to the system in accordance with the demand placed thereon and apportions the input power in accordance with individual loads placed on the system by driven entities.

2. Description of the Prior Art

Drive systems have traditionally been employed for coupling a drive means to a driven mechanism and will vary in complexity in accordance with the particular components of the system, the use, and the degree of control needed or desired. For example, a very simple driven system may include an internal combustion engine the output of which is coupled by a chain sprocket arrangement to drive a circular saw. A good example of a more complex drive system is the well known drive train of an automotive vehicle. These traditional drive systems, regardless of complexity, all work toward the accomplishment of a very simple objective; namely, the connection of a single drive means to a single driven mechanism, and this may be seen upon considering the above examples. In the first example, the engine simply drives the saw and in the second example, the engine drives the wheels of the automotive vehicle.

It has been known for many years that the traditional drive systems in general, and the automotive drive trains in particular, are very inefficient in their use of fuel and contribute significantly to environmental pollution. More recently, environmental considerations along with fossil fuel availabilities and costs, have drawn considerable attention to these known deficiencies and drawbacks, and many attempts have been made to develop a drive system which uses no fossil fuel and is nonpolluting. A known way of accomplishing such objectives is with a purely electric drive. However, due to storage battery limitations, electrically operated vehicles have received very limited commercial acceptance.

As a result of the known drawbacks of the traditional drive systems and electric drive systems, attempts have been made to combine the two to produce a hybrid system that reduces the drawbacks of the two separate systems.

A number of patents have been issued which disclose such hybrid systems as including an internal combustion engine, an electric traction motor, a generator, a battery and a mechanical gear transmission. These hybrid prior art systems have been configured in various ways in attempts to solve the above mentioned problems, and none have achieved a degree of success which is significant enough to warrant anything more than very limited production.

To the best of my knowledge, the prior art hybrid system most closely related to the instant invention is disclosed in U.S. Pat. No. 3,566,717 issued on Mar. 2, 1971 to Berman et al. This particular prior art drive system includes an internal combustion engine the output shaft of which is connected to drive the sun gear of a planetary gear train. The planet gears of the train are mounted on a planet carrier which is in the form of a gear and power is taken off of that gear to drive a generator. The ring gear of the planetary gear train powers the system output shaft which carries a gear to couple a motor-generator thereto. In this prior art system, the internal combustion engine is running at all times as the main source of power, and the generator operates to charge the batteries only when the vehicle is accelerating and must be locked out of the system when the vehicle is at cruising speed or is coasting. The motor-generator is used as a variable power input device during vehicle acceleration to allow steady state operation of the internal combustion engine in one operating mode and to minimize throttle excursions in another mode. When the vehicle is in steady state operation, or is coasting, the motor-generator is switched to its generating function for battery charging purposes.

From the above, it will be seen that this particular prior art system relies on the operation of the internal combustion engine as the main source of power and uses the motor-generator to reduce, or eliminate, engine RPM fluctuations. Although this will reduce fuel usage and pollution somewhat, the reduction is not significant enough to warrant the high cost of converting to such a system. Further, this system cannot be used as a purely electric drive system at any time, and in particular at the time of steady state, or coasting of the vehicle when electric drive is most desirable due to minimal power drainage from the batteries at those times. This prior art system cannot be used as an electric drive system, with a power boost when needed from the internal combustion engine due to the fact that the generator must be locked against rotation and electrically disconnected from the system when the vehicle is operating in the steady state, or is coasting, and the motor-generator must be switched to its generating mode at those times for battery charging purposes. The generator is locked out of the system to prevent reverse driving thereof which, in addition to possible ruining the generator, causes the entire system to be thrown into an unstable state due to the free running of the generator in the reverse direction causing the bulk of the output power from the internal combustion engine to be delivered to the generator and very little, if any, to the system output shaft.

SUMMARY OF THE INVENTION

In accordance with the present invention, a new and improved drive system is disclosed which includes an electric drive subsystem which may be operated by itself when it is advantageous to do so and may be operated in conjunction with a power input subsystem which regulates the amount of input power to the system in accordance with demand and apportions it in accordance with demand for supplemental driving of the system's output shaft and the need for battery charging.

The drive system includes an operator controlled variable speed electric traction motor which is coupled to rotatably drive the output shaft of the system. A power input device, which is operator enabled and is in the preferred form of an internal combustion engine, is connected through a torque apportioning means for supplementing rotational driving of the system's output shaft and for driving a generator, with the input power being apportioned in accordance with the demands, or loads, placed on the system by its output shaft and by the generator. Various controls and sensors are employed to monitor the drive system's batteries and electric circuitry to operate the internal combustion engine in accordance with the state of the batteries and electric circuitry.

With both the electric drive subsystem and the power input subsystem enabled, and a relatively heavy load on the drive system's output shaft, the electric motor will draw heavily on the batteries and the sensors and controls will operate the internal combustion engine to increase power input to the drive system. The input power will be apportioned by the torque apportioning means to supply a greater portion of the input power to the generator and a lesser portion to the output shaft. This will boost the voltage in the electric circuit for proper motor operation and this, along with the power directly received at the drive system's output shaft from the torque apportioning means, will cooperatively operate to overcome the heavy load thereon. As the output shaft load decreases, the torque apportioning means decreases the torque applied to the generator and increases the torque applied to the output shaft. When the output shaft load and the generator load reach equilibrium, the torque apportioning means will lock up due to inherent properties thereof, and equal torque will be applied to the system's output shaft and to the generator. The total amount of torque which is apportioned by the torque apportioning means is determined by the RPM of the internal combustion engine whose RPM is in turn determined by the state of the batteries and the system's electric circuitry. If the batteries are at a low charge state, the engine will operate at a high RPM to reduce the drive requirements of the electric motor and charge the batteries. If the batteries are at a relatively high charge state, the engine RPM will drop to a point where the generator will produce enough power to keep the motor operating and maintain the charged state of the batteries.

The torque apportioning means operates in conjunction with a locking mechanism which locks the system output shaft, the generator drive shaft and the engine drive shaft together when the load on the system's output shaft drops below that of the generator shaft. This keeps the drive system under control by preventing free running of the generator in the reverse direction.

Accordingly, it is an object of the present invention to provide a new and improved drive system.

Another object of the present invention is to provide a new and improved drive system which includes an electric drive subsystem.

Another object of the present invention is to provide a new and improved drive system which includes an electric drive subsystem which is optionally operable in conjunction with a power input subsystem.

Another object of the present invention is to provide a new and improved drive system of the above described character wherein the amount of power input to the system by the power input subsystem is variable in accordance with the demand placed on the drive system.

Another object of the present invention is to provide a new and improved drive system of the above described character wherein the power supplied to the system by the power input subsystem is apportioned to drive separate driven entities in accordance with the varying loads placed on the system by those entities.

Another object of the present invention is to provide a new and improved drive system of the above described character wherein the power input subsystem includes a power input device which supplies power in an amount determined by system demand to a torque apportioning means which supplies power to the system's output shaft and a generator in accordance with the loads applied thereby.

Another object of the present invention is to provide a new and improved drive system of the above described character which includes a locking means which locks the power input device, the generator and the system output shaft together to prevent free running of the generator in a reverse direction when the system output shaft applies a load on the torque apportioning means which is less than the load applied thereon by the generator.

The foregoing and other objects of the present invention, as well as the invention itself, may be more fully understood from the following description when read in conjunction with the accompanying drawings.

BRIEF DESCRIPTION OF THE DRAWINGS

FIG. 2 is an enlarged diagrammatic view illustrating the torque apportioning means of the drive system of the present invention.

FIG. 3 is an enlarged diagrammatic view illustrating one of the sensor/control mechanisms of the instant drive system.

FIG. 6 is a diagrammatic view illustrating a third embodiment of the drive system of the present invention.

DESCRIPTION OF THE PREFERRED EMBODIMENTS

Figure 1:
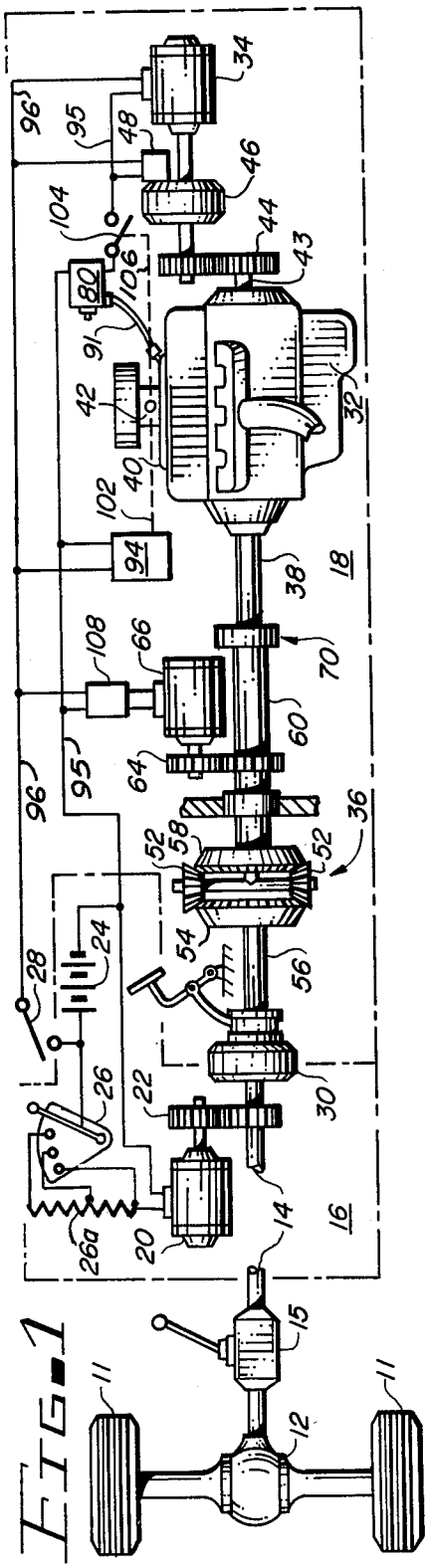
FIG. 1 is a diagrammatic view of the preferred embodiment of the drive system of the present invention.

Referring more particularly to the drawings, FIG. 1 illustrates the preferred embodiment of the drive system of the present invention which is indicated generally by the reference numeral 10.

The drive system 10, as will become apparent as this description progresses, may be employed to drive a variety of mechanisms, and for completeness of this disclosure, is shown as being employed to drive an automotive vehicle which is indicated in the drawings by the vehicle wheels 11, which are driven by means of a conventional differential 12. The drive shaft 14 of the differential 12 may have a conventional slide gear transmission 15 therein to provide for selective forward and reverse driving of the vehicle wheels 11.

With regard to the drive system itself, it is a combination of two subsystems each of which, under some circumstances may be operated independently, but in most cases are cooperatively interacting. The two subsystems which make up the drive system 10 may be referred to as a prime mover, or electric drive subsystem 16 and a power input subsystem 18.

Prime Mover Subsystem

The prime mover subsystem 16 includes a variable speed electric traction motor 20 which is suitably sized so as to be capable in and of itself to provide sufficient horsepower to drive the drive-shaft 14 which is the output shaft of the drive system 10. The electric motor 20 may be coupled to the output shaft 14 in any of several well known manners, such as by the illustrated gear train means 22.

Electric power for operating the motor 20 is supplied from a suitable battery 24, or bank of batteries, which are coupled through a manually operable multiposition switch 26 to the motor.

The prime mover subsystem 16, as hereinbefore mentioned, is capable of independent operation and, therefore, the prime mover subsystem 16 and the power input subsystem 18 are interfaced by an electric decoupling switch 28, which electrically enables the power input subsystem 18 when in its closed position, and by a mechanical decoupling clutch 30, which mechanically enables the power input subsystem 18 when it is engaged. The switch 28 and the clutch 30 are operator controlled devices, therefore, the prime mover subsystem 16 is independently operable at drive discretion, and may be employed to propel the vehicle wheels 11 in a well known manner for relatively short times and distances as determined by the storage capacity of the batteries 14, speed of the vehicle and the like.

Power Input Subsystem

The power input subsystem 18 includes a power input device in the preferred form of an internal combustion engine 32, a starter/power booster motor 34 for starting and boosting the power output of the engine 32, a torque apportioning means 36 and various sensor/control devices as will hereinafter be described in detail.

The internal combustion engine 32 may be of any convenient size, but due to operation of the drive system 10 may be considerably smaller than the prime mover motor 20 as far as its horsepower rating is concerned, and this, of course, is advantageous from environmental and fuel consumption standpoints.

In any event, the internal combustion engine 32 is more or less conventional and is provided with the usual output shaft 38, intake manifold 40, a carburetor 42 which is modified in that its idle jets (not shown) are blocked, or otherwise kept from performing their usual function. Although the starter/power booster motor 34 may be coupled to the engine output shaft 38 to accomplish its intended functions, as will hereinafter be described, for illustrative purposes the internal combustion engine 32 is shown as having an input shaft 43. The engine input shaft 43, which may be simply an extension of the engine's crankshaft (not shown), is coupled such as through a suitable gear train 44 to a normally disengaged clutch 46 which is actuatable by means of an electric solenoid 48. The clutch 46 and its operating solenoid 48 are employed to automatically couple and decouple the starter/booster motor 34 to the internal combustion engine 32 in response to operating conditions of the drive system 10 as will hereinafter be described in detail.

The output shaft 38 of the power input engine 32 is connected to the torque apportioning means 36 in the manner best seen in FIG. 2. The shaft 38 is connected to a carrier 50 in the illustrated form of a rotatable stub shaft on the opposite ends of which, differential pinion gears 52 are freely rotatably carried. Thus, the carrier 50 and the pinion gears 52 are rotatably driveable about the longitudinal axis of the engine output shaft 38. The pinion gears are in meshed engagement with a first differential side gear 54 which has a first drive shaft 56 extending axially therefrom, and a second differential side gear 58 having a second drive shaft 60 extending axially therefrom. For reasons which will become apparent as this description progresses, the second drive shaft 60 of the torque apportioning means 36 is a hollow structure through which the engine output shaft 38 coaxially extends, with the engine output shaft 38 being journaled in bearings 62 carried in the bore of the second drive shaft 60.

It may now be recognized that the torque apportioning means 36 is a modified differential gear mechanism, and to insure a clear understanding of the description which is to follow, a brief description of the gear interaction is deemed appropriate.

As is well known, when the loads on two differential side gears 54 and 58 are equal, the differential pinion gears 52 act as a solid connection between the side gears, and thus, the first and the second drive shafts 56 and 60 and the engine output shaft 38 will all rotate at the same RPM as if they were solidly interconnected. With unequal loading of the differential side gears, the differential pinion gears will roll around the slower moving side gear, i.e., the one with the heavier load, and this rotation is added to the rotation of the carrier 50 which results in the side gear having the lighter load being driven at a proportionally faster rate. Due to this inherent characteristic, the differential side gear having the lighter load will have more torque applied thereto than the gear with the heavier load.

The first drive shaft 56 of the torque apportioning means 36 is coupled through the decoupling clutch 30 to the drive shaft 14 which supplies power to the vehicle wheels 11 in the hereinbefore described manner. The second drive shaft of the torque apportioning means 36 is suitably coupled, such as by means of the illustrated gear train means 64 to drive a generator 66.

As will hereinafter be described, the torque apportioning means 36 will apportion the torque supplied by the power input engine 32 to the two driven entities; namely, the vehicle wheels 11 and the generator 66, in accordance with the varying loads applied thereto by those entities.

As will also be hereinafter described, the second drive shaft 60 of the torque apportioning means 36 must not be allowed to slow down below the RPM of either the engine output shaft 38 or the first drive shaft 56. Therefore, the torque apportioning means 36 operates in conjunction with a locking means 70 which locks the second drive shaft 60 to the engine output shaft 38 when the RPM of the second drive shaft 60 decreases to where it equals the RPM of the engine drive shaft. Although the required locking function may be accomplished in other ways, such as by locking the first and second drive shafts 56 and 60 together, for simplicity reasons, the locking means 70 is seen in FIG. 2 to include the interacting complimental elements of a drum 72 mounted fast on the free end of the second drive shaft 60 for rotation therewith, and a ratchet wheel 74 carried on the engine output shaft 38. A plurality of pawls 75 (one shown) are pivotably carried on suitable pivot pins 76 in equally spaced circumferential increments within the drum 72. The ratchet wheel 74, which is mounted fast on the engine output shaft 38, is disposed to rotate within the drum 72. As long as the RPM of the drum 72 exceeds that of the ratchet wheel 74, the pawls 75 will simply slide over the teeth of the ratchet wheel. However, when the RPM of the drum decreases to a point where it equals that of the ratchet wheel, the pawls will engage the ratchet wheel teeth thus locking the second drive shaft 60 of the torque apportioning means 36 to the engine output shaft 38.

The power input subsystem includes sensing and control devices as hereinbefore mentioned which sense the operating conditions of the drive system 10 and control operation of the engine 32 and the starter/power booster motor 34 in accordance with those sensed conditions.

The first of these analog, or sensor/control devices is a vacuum sensor means 80 which may be any of several well known devices that sense pressure differentials. As shown schematically in FIG. 3, the vacuum sensor means 80 includes a diaphragm 83 which is coupled by means of a rod 84 to a switch 85. The diaphragm 83 is mounted so as to divide a sensor housing 86 into a vacuum sensing chamber 87 and an ambient pressure sensing chamber 88, and the diaphragm is adjustably biased by means of a suitable spring 89. The ambient pressure sensing chamber 88 is always at atmospheric pressure due to a vent port 90 formed in the side of the housing 86, and the pressure sensed in the vacuum sensing chamber 87 will correspond with that in the engine's intake manifold 40 in that a hose 91 is employed to interconnect the chamber 87 and the manifold 40 as shown in FIG. 1. When the internal combustion engine 32 is inoperative, both of the chambers 87 and 88 will be at atmospheric pressure so that the movable arm of the switch 85 will be in conductive contact with the terminal 92 due to spring bias, with this position of the switch being described as its closed position. When the engine 32 is running at a comparatively light load, i.e., efficiently, the vacuum sensed is relatively high and the large pressure differential across the diaphragm 83 will move the switch contact from the terminal 92 to the terminal 93 thus opening the switch 85. When the load on the engine 32 increases a predetermined amount from the relatively lightly loaded state, the vacuum sensed will decrease and result in movement of the switch arm from the terminal 93 back to the terminal 92 thus returning the switch 85 to its closed position.

Figure 4:
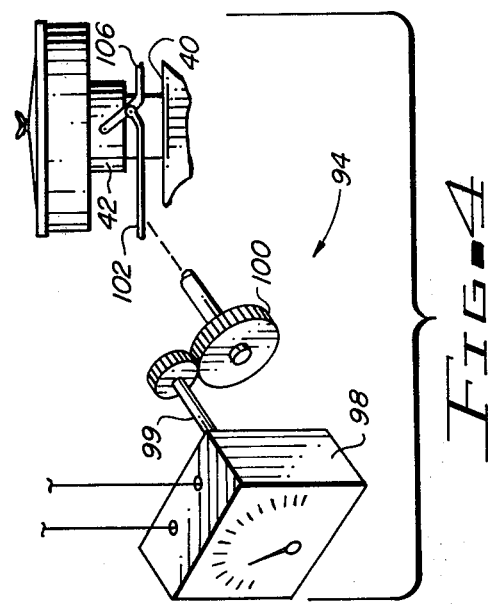
FIG. 4 is an enlarged diagrammatic view illustrating another one of the sensor/control mechanisms of the drive system.

The second analog device is a voltage sensor means 94 which may be any of several well known devices designed for that purpose. The voltage sensor means 94 is coupled by means of conductors 95 and 96 so that when the decoupling switch 28 is closed, it is across the terminals of the battery 24. In this way, the voltage sensor 94 will sense the voltage value in the battery and is therefore sensitive to the charged state and to load produced voltage drops. The voltage sensor means 94 is shown diagrammatically in FIG. 4 as including a volt meter 98, the indicator pointer shaft 99 of which is coupled through a suitable gear train 100 to the throttle linkage 102 of the engine's carburetor 42. When the sensed voltage is at a normal value, that is with the batteries 24 fully charged and no load on the batteries, the throttle linkage 102 will be in the retracted position. When retracted, the engine will be inoperative in that no fuel will be supplied and due to the hereinbefore mentioned disabled idle jets (not shown). When the sensed voltage is low, the throttle linkage 102 is advanced in proportion to the drop in voltage and fuel will be supplied to the engine.

As seen in FIG. 1, the conductor 95 passes through the vacuum sensor means 80 and thus the switch 85 is in the conductor 95. An engine start enable switch 104 is also in conductor 95 and is mechanically operated by means of a throttle extension rod 106. When the throttle linkage 102 is retracted, the start enable switch 104 is open and when the linkage 102 is advanced, the throttle extension rod 106 is also moved to close the switch 104.

When the switches 85 and 104 are closed, the circuit through conductors 95 and 96 will be completed to the solenoid 48 and to the starter/booster motor 34. When this circuit is completed, the solenoid is energized to engage the clutch 46 and operate the starter/power booster motor 34.

Drive System Operation

Since the independent operation of the prime mover subsystem 16 is obvious as hereinbefore described, the following operational description will relate to the cooperatively interacting operation of the two subsystems 16 and 18.

In the drive system 10 of the present invention, the load applied to the motor 20 and the first differential side gear 54, in the automotive environment selected for descriptive purposes, is the mechanical and road friction of the vehicle's differential 12, transmission 15 and the driven wheels 11. The load applied to the second differential side gear 58 is the generator 66 which is coupled through the usual voltage regulator 108 to the conductors 95 and 96.

When the automotive vehicle (not shown) is at rest, the entire drive system 10 will be in the static state provided that the multiposition switch 26 is in its off position as shown in FIG. 1, and the switch 28 is open. Closing of the switch 28 will complete the circuit through the voltage sensor means 94 which senses the voltage in the circuit. When the batteries 24 are in the fully charged state nothing will happen and the entire drive system will remain inoperative. However, when the batteries are less than fully charged, the voltage sensor means will respond by moving the throttle linkage 102 to supply fuel to the engine 32 in the manner hereinbefore described, and this same movement will mechanically close the enable switch 104. This applies battery voltage to the solenoid 48 and to the starter/power booster motor 34 to start the internal combustion engine 32.

When the vehicle is at rest and the engine 32 is operative due to less than a fully charged state of the batteries 24, the engine 32 will operate through the torque apportioning means 36 to drive the generator 66 for battery charging purposes in the manner to be described.

To move the vehicle from the at rest position, with the switch 28 closed and the clutch 30 engaged, the operator advances the multiposition switch 26 to apply battery voltage through the resistor 26a to the electric motor 20. Operation of the electric motor 20 will result in vehicle movement and due to the heavy load, will cause a voltage drop in the system's electric circuit. If the engine 32 and the starter/booster motor 34 are already operating, due to the less than fully charged state of the batteries 24 as previously described, the voltage drop in the system's electric circuit will simply increase the RPM of the engine 32 in proportion to the voltage drop. If the engine 32 and the starter/booster motor 34 were inoperative, due to a fully charged state of the batteries 24, the engine 32 will be started in the hereinbefore described manner due to the voltage drop.

Therefore, when the multiposition switch 26 is advanced to move the vehicle from an at rest position, the electric motor 20, the internal combustion engine 32, and the starter/booster motor 34 will all be operational. In this initial start state, the load on the differential side gear 54 will be considerable due to inertia of the vehicle, and the load on the other side gear 58 will be comparatively lighter. Thus, the rotational driving forces applied by the engine 32 and the starter/booster motor 34 will drive the side gear 58 considerably faster than it will drive the side gear 56, with the result that the generator 66 will be operating at or near full capacity. The power output from the generator is coupled through the voltage regulator 108 into the electric circuit and the system voltage, which initially dropped at the beginning of the vehicle moving stage, is boosted to full value. With the motor 20 now receiving full voltage, it will operate more quickly to overcome the load applied by inertia of the vehicle, and it will be assisted in this task by the rotational driving forces applied directly to the drive shaft 14 by the differential side gear 54.

As the vehicle gains momentum, the load applied to the differential side gear 54 will decrease and the torque applied by the engine output shaft 38 will be more equally divided by the torque apportioning means 36. As this gain in vehicle momentum occurs, the electric power demanded by the motor 20 will decrease simultaneously with the decrease in torque applied to the generator 66 with the generator developing just enough electric power to drive the motor 20.

At some point between the initial vehicle start up and the point where the vehicle is moving at a cruising speed, the starter/booster motor 34 will cease to operate. This occurs when the decreasing load on the internal combustion engine 32 allows the vacuum in its intake manifold 40 to decrease to a value which causes the switch 85 of the vacuum sensor means 80 to open. When the switch 85 opens, the electric power to the solenoid 48 and to the starter/booster motor 34 is interrupted. The point at which such interruption occurs is adjustable by virtue of the adjustment means 110 provided on the vacuum sensor means 80.

As the vehicle approaches the cruising speed, the loads on the two differential side gears 54 and 58 will approach equality, and thus the torque applied to the vehicle's wheels 11 and to the generator 66 will approach equality. When actual equality is achieved, the torque apportioning means 36 will rotate as if it were a solid unit. When the torque apportioning means 36 locks up in this fashion, the shafts 38, 56 and 60 will all be rotating at the same speed, and this allows the pawls 75 of the locking mechanism means 70 to engage the teeth of the ratchet wheel 74 to insure that the RPM of the generator drive shaft 60 will not fall below the RPM of the engine drive shaft 38 as will be described.

The state of equal loading on the differential side gears 54 and 58 during the vehicle cruising mode is an ideal situation which cannot be controlled with any absolute degree of certainty. For example, a head wind, tail wind, upgrade, downgrade and the like will effect the equal loading condition. However, equipment design as it relates to component sizing will control this variable within reasonable limits, and thus when the system is operating in a cruising mode, the loads on the side gears 54 and 58 will be equal or nearly so. Anyway, in this cruising mode, the power input from the internal combustion engine 32 will be substantially equally divided between the shafts 56 and 60, and the engine RPM will be controlled by the voltage sensing means 94. Thus, the engine RPM is determined by the combination of the demand of the electric motor 20 and the charged states of the batteries 24, and since the motor demand is minimized in this cruising mode, the state of battery charge becomes the controlling factor. The engine RPM will drop as the batteries approach a fully charged state but the engine will not shut off due to the continuing demand of the electric motor 20.

When the vehicle is going downhill, coasting, or any other condition which results in a decrease in the load on the differential side gear 54, the inherent tendency of the torque apportioning means 36 is to drive that lightly loaded side gear 54 faster. This could create a dangerous situation if it weren't for the locking mechanism means 70 which mechanically connects the generator drive shaft 60 to the engine drive shaft 38, and thus locks up the torque apportioning means 36.

In the absence of the locking means 70, the decreasing load on the side gear 54 would cause an increase in the speed thereof and a slowing of the other side gear 58. If the RPM of the side gear 58 were allowed to drop below that of the engine drive shaft 38 or the first drive shaft 56, the result would be that the differential side gear 58 would come to a stop and run free in a reverse direction. In addition to disrupting the operation of the drive system 10, this could ruin the generator 66.

The locking mechanism means 70 prevents such reverse driving by mechanically connecting the generator drive shaft 60 to the engine output shaft 38 in the manner hereinbefore described. This mechanical locking will fix the differential pinion gears 52 against rotation on the carrier 50 and this results in a complete lock up of the torque apportioning means 36. In this manner, the internal combustion engine 34 and the generator 66 will combine to act as a brake to prevent the vehicle wheels 11 from running away.

When the torque apportioning means 36 is locked up in this manner, due to a decrease in the load on the side gear 54, the power supplied by the motor 20 along with that derived from inertia of the vehicle will be fed back through the torque apportioning means 36 where it combines with the power input from the engine 32 to drive the generator 66. In this mode, all generated power in excess of the minimal amount demanded by the motor 20, will be employed for battery charging purposes.

When the vehicle is to be brought to a stop, the operator moves the multiposition switch 26 to its off position which interrupts the power supply to the electric motor 20. In this instance, inertia of the vehicle and engine power continue to cooperatively run the generator 66 with its total output being used for battery charging purposes. When the vehicle comes to a complete stop, the load on the differential side gear 54 will become very high which in effect, locks it against rotation. In this mode, the power input from the engine 32 will be directed through the torque apportioning means 36 to operate the generator 66. And thus, battery charging will continue at a rate determined by the charge state of the batteries 24. For example, if the charge on the batteries is low, the engine 32 will run at a relatively high RPM, and as the charge increases, the engine RPM will drop and when the batteries become fully charged, the engine 32 will be shutoff by virtue of the voltage sensor means 94.

Although the above described drive system 10 is the preferred embodiment, it will be appreciated that various modifications can be made thereto. For example, the starter/power booster motor 34 is included to enable the use of a relatively small internal combustion engine 32, with peak power demands being satisfied by operation of both the internal combustion engine 32 and the starter/power booster motor 34. Although this arrangement is desirable from environmental and fuel consumption standpoints, it is not critical to the operation of the drive system 10. An alternative would be to increase the size of the engine 32 to where it alone would be capable of meeting the system demands, and using a conventional starter motor/Bendix drive arrangement (not shown).

Another example of a modification to the illustrated drive system 10 is regarding the torque apportioning means 36. Instead of using the modified differential mechanism illustrated and described, the same end results could be achieved by modifying a planetary gear train (not shown) so that it would be capable of locking up to prevent reverse driving of the generator.

Figure 5:
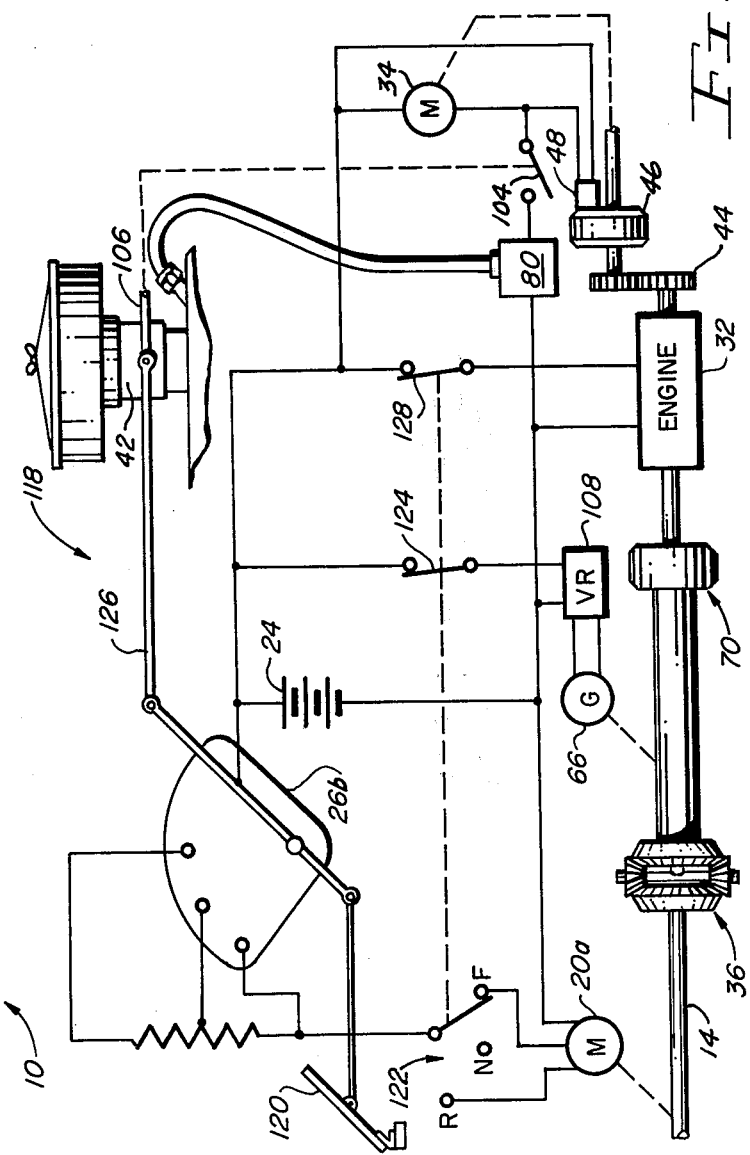
FIG. 5 is a schematic view illustrating a second embodiment of the drive system of the present invention.

Reference is now made to FIG. 5 which schematically illustrates a second embodiment of the demand operated power management drive system of the present invention, with this embodiment being identified in its entirety by the reference numeral 118.

The drive system 118 includes a reversible variable speed electric traction motor 20a as the prime mover of the system. The speed of the motor 20a is controlled by the multiposition switch 26b which is shown as being operated by a conventional foot feed mechanism 120. Reverse driving of the motor 20a is accomplished by a suitable drive selector switch 122 which is connected for ganged operation with a generator disconnect switch 124. When the drive selector switch 122 is in either its neutral (N) or reverse (R) positions, the generator disconnect switch 124 is open thus electrically disconnecting the generator 66. When the drive selector switch 122 is in its forward (F) position, the generator disconnect switch 124 is closed to electrically connect the generator into the system. The multiposition switch 26b is mechanically coupled, such as by means of a suitable linkage 126, directly to the throttle of the carburetor 42 of the internal combustion engine 32. With such a mechanical linkage, the power input subsystem will respond to operator demands rather than to voltage demands as was the case in the previously described drive system 10.

When the multiposition switch 26b is in the off position, as shown, the throttle extension rod 106 will hold the engine start enable switch 104 off to prevent energization of the solenoid 48 and operation of the starter/power booster motor 34. When the multiposition switch 26b is advanced, battery voltage is applied to the drive selector switch 122 and the engine enable switch 104 is closed. Such advancing of the multiposition switch 26b with the drive selector switch 122 in its neutral position, will start the engine 32 and it will become operational at an RPM determined by the position of the multiposition switch 26b. In this same state which is the starting, or idle mode, all the power produced by the engine 32 will be directed by the torque apportioning means 36 to the generator 66 in that it is able to run free due to its being disconnected from the system. When in this starting, or idle mode, movement of the drive selector switch 122 to its forward position will apply battery voltage to the motor 20a and connect the generator 66 to the system. In this forward operating mode the torque apportioning means 36 will operate in the hereinbefore described manner to distribute the power input by the engine 32 to the motor 20a and to the generator 66 in accordance with the loads thereon.

When the system 118 is in its start up, or idle mode, and the drive selection switch 122 is moved to its reverse position, operation of the engine 32 is interrupted by means of an interrupt switch 128 which is connected for ganged operation with the drive selector switch 122 and is suitably connected to the ignition system (not shown) of the engine 32. Thus, in this reverse drive mode, the engine 32 is inoperative, generator 66 is disconnected, and the motor 20a is operating in the reverse direction. The load applied to the torque apportioning means 36 by the inoperative engine 32 is larger in comparison to that applied by the disconnected generator 66. Thus, rotation of the system drive shaft 14, resulting from operation of the motor 20a, will result in a torque feedback through the torque apportioning means 36 which directs that torque feedback to the generator 66 causing it to spin freely.

The drive system 118 as described above is ideally suited for use in lightweight vehicles such as commuter vehicles, golf carts, go-carts and the like, wherein weight and complexity are of prime concern. To illustrate this point, the use of the reversible motor 20a eliminates the need for the transmission 15 of the drive system 10. The engine interrupt switch 128 and generator disconnect switch 124 allows reverse driving without the need for operating the generator 66 and engine 32, and the mechanical linkage 126 is considerably simpler than the sensor controls used in the drive system 10.

Still another embodiment of the drive system of the present invention is illustrated schematically in FIG. 6 with this embodiment being indicated generally by the reference numeral 130. In this embodiment, the internal combustion engine 32 is provided with a conventional starter motor 132 which is engaged by means of a suitable momentary contact switch 134 which is normally open and is momentarily closed upon advancement of the multiposition switch 26c. The multiposition switch 26c is mechanically connected by the throttle rod 136 to the engine's carburetor 42. Thus, starting and operation of the engine 32 is essentially the same as that in the hereinbefore described drive system 118.

The essential difference in the drive system 130 is readily apparent in the drawing as being concerned with the prime mover which instead of being the output shaft 14 of the system is used at another point of use. The prime mover is shown as including a pair of reversible variable speed motors 20c which are connected to drive the front wheels 138 of an automotive vehicle. In this manner, the power supplied by the engine 32 to the torque apportioning means 36 is directed to the back wheels 140 and to the generator 66 in accordance with the loads applied thereby as previously described, and the motors 20c are the prime movers of the vehicle.

While the principles of the invention have now been made clear in illustrated embodiments, there will be immediately obvious to those skilled in the art, many modifications of structure, arrangements, proportions, the elements, materials, and components used in the practice of the invention, and otherwise, which are particularly adapted for specific environments and operation requirements without departing from those principles. The appended claims are therefore intended to cover and embrace any such modifications within the limits only of the true spirit and scope of the invention.

What I claim is:

1. A drive system comprising:
   (a) a first driven entity;
   (b) a prime mover means coupled to drive said first driven entity;
   (c) a second driven entity;
   (d) a power input means;

(e) a torque apportioning means coupled to receive power from said power input means and coupled to said first and said second driven entities for apportioning power received from said power input means to said first and said second driven entities in accordance with the loads thereon; and (f) locking means associated with said torque apportioning means for locking thereof to apply the power received from said power input means equally to said first and said second driven entities when the load on said first driven entity becomes less than the load on said second driven entity.

2. A drive system as claimed in claim 1 and further comprising means for optionally decoupling said first driven entity and said prime mover from said power input means, said second driven entity, said torque apportioning means and said locking means to allow independent driving of said first driven entity by said prime mover.

3. A drive system as claimed in claim 1 and further comprising:
(a) said prime mover including,
 I. drive means,
 II. a power supply coupled to said drive means,
 III. means for controlling the power supplied by said power supply to said drive means; and
(b) means for sensing the state of said power supply and operating said power input means to increase the amount of power input when said power supply is at a low state and decrease the amount of power when said power supply is at a high state.

4. A drive system as claimed in claim 1 wherein said prime mover comprises:
(a) at least one variable speed electric motor;
(b) storage battery means coupled to said motor for supplying operating power thereto; and
(c) a multiposition switch means connected between said motor and said storage battery means for controlling the power supplied to said motor.

5. A drive system as claimed in claim 4 and further comprising means for sensing the voltage of said storage battery means and operating said power input means at a high power input level when the sensed voltage is at a low level and operating said power input means at a low power input level when the sensed voltage is at a high level.

6. A drive system as claimed in claim 4 wherein said second driven entity is a generator.

7. A drive system as claimed in claim 1 wherein said power input means is an internal combustion engine.

8. A drive system as claimed in claim 1 wherein said torque apportioning means comprises:
(a) a power input shaft connected to said power input means;
(b) a first output shaft coupled to said first driven entity for assisting said prime mover in the driving thereof;
(c) a second output shaft coupled to said second driven entity for driving thereof; and
(d) gear means for dividing the power input thereto between said first and said second output shafts in accordance with the loads applied thereto respectively by said first and said second driven entities.

9. A drive system as claimed in claim 8 wherein said locking means comprises complimental elements of a locking mechanism on said second output shaft and on said power input shaft for locking said second output shaft to said power input shaft when the RPM of said second output shaft attempts to fall below the RPM of said power input shaft.

10. A drive system comprising:
(a) a driven entity;
(b) at least one variable speed electric traction motor coupled to drive said driven entity;
(c) a storage battery means coupled to supply power to said motor;
(d) a multiposition switch means connected between said motor and said storage battery means for controlling the amount of power supplied to said motor;
(e) a power input means;
(f) a generator connected for charging said storage battery means;
(g) a torque apportioning means having an input shaft coupled to receive power from said power input means and having a first output shaft coupled to assist said motor in driving said driven entity and a second output shaft coupled to drive said generator, said torque apportioning means having gear means for apportioning the power received thereby to said first and said second output shafts in accordance with the loads thereon; and
(h) locking means associated with said torque apportioning means for locking said torque apportioning means so that its first and second output shafts rotate at the same RPM when the load on its first output shaft is equal to or less than the load on its second output shaft.

11. A drive system as claimed in claim 10 and further comprising means connected between said multiposition switch means and said power input means for operating said power input means in accordance with the operation of said variable speed electric traction motor.

12. A drive system as claimed in claim 10 and further comprising means for sensing the charged state of said storage battery means and controlling the operation of said power input means in accordance with that charged state.

13. A drive system as claimed in claim 10 and further comprising means for sensing the battery voltage of said storage battery means and holding said power input means inoperative when said storage battery means is fully charged and operating said power input means at a rate which is proportional to the amount that said storage battery is less than fully charged.

14. A drive system as claimed in claim 10 wherein said power input means is an internal combustion engine.

15. A drive system as claimed in claim 13 wherein said power input means comprises:
(a) an internal combustion engine connected to the input shaft of said torque apportioning means;
(b) starter means coupled to said internal combustion engine; and
(c) said internal combustion engine and said starter means coupled to said means for sensing battery voltage so that said internal combustion engine is started and operated when said storage battery means is less than fully charged and is shut off when said storage battery means is fully charged.

16. A drive system as claimed in claim 15 wherein said starter means comprises:
(a) a starter/power booster motor;
(b) a clutch connected between said starter/power booster motor and said internal combustion engine, said clutch having a normal first state wherein said starter/power booster motor is decoupled from said internal combustion engine and a second state which couples said starter/power booster motor thereto;

(c) solenoid means for actuating said clutch from its normal first state to its second state;

(d) circuit means connecting said starter/power booster motor and said solenoid means to said storage battery means;

(e) switch means in said circuit means for opening and closing thereof; and (f) said means for sensing battery voltage coupled to said switch means for opening said circuit means when said storage battery means is fully charged and closing said circuit means when said storage battery means is less than fully charged.

17. A drive system as claimed in claim 16 and further comprising means for sensing the load on said internal combustion engine, said means for sensing the load connected to a switch means in said circuit means for closing said circuit means which the load on said internal combustion engine is relatively heavy and opening said circuit means when the load is relatively light.

18. A drive system as claimed in claim 17 wherein said means for sensing the load on said internal combustion engine is a vacuum sensing mechanism.

19. A drive system as claimed in claim 10 wherein said locking means comprises complimental elements of a locking mechanism on the second output shaft and on the power input shaft of said torque apportioning means for locking the second output shaft to the power input shaft when the RPM of said second output shaft attempts to fall below the RPM of said power input shaft.

20. A drive system as claimed in claim 10 wherein said locking means comprises:

(a) a ratchet wheel on the input shaft of said torque apportioning means for rotation therewith, said ratchet wheel having teeth on the periphery thereof;

(b) a drum on the second output shaft of said torque apportioning means and disposed so that said ratchet wheel is rotatable in said drum; and (c) at least one pawl pivotably mounted in said drum for movement into locked engagement with the teeth of said ratchet wheel when the RPM of said drum is equal to the RPM of said ratchet wheel and for movement out of locked engagement with the teeth of said ratchet wheel when the RPM of said drum is greater than the RPM of said ratchet wheel.

* * * * *